US006801221B2

(12) United States Patent
Kawamura et al.

(10) Patent No.: US 6,801,221 B2
(45) Date of Patent: Oct. 5, 2004

(54) SCANNING LINE INTERPOLATING DEVICE

(75) Inventors: Hideaki Kawamura, Moriyama (JP); Mitsuhiro Kasahara, Hirakata (JP); Tomoaki Daigi, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 257 days.

(21) Appl. No.: 10/169,753

(22) PCT Filed: Dec. 6, 2001

(86) PCT No.: PCT/JP01/10703

§ 371 (c)(1),
(2), (4) Date: Jul. 18, 2002

(87) PCT Pub. No.: WO02/51143

PCT Pub. Date: Jun. 27, 2002

(65) Prior Publication Data

US 2003/0038817 A1 Feb. 27, 2003

(30) Foreign Application Priority Data

Dec. 14, 2000 (JP) ........................................ 2000-380904

(51) Int. Cl.[7] .............................. G09G 5/00; G09G 5/02
(52) U.S. Cl. ........................ 345/698; 345/213; 345/214
(58) Field of Search ................................. 345/204, 213, 345/214, 606, 611, 612, 613, 614, 634, 640, 656, 695, 698; 358/31, 40; 348/448, 449, 450, 451, 452, 458

(56) References Cited

U.S. PATENT DOCUMENTS

| | | | | |
|---|---|---|---|---|
| 4,953,009 A | * | 8/1990 | Yamada et al. | ............. 348/670 |
| 5,019,903 A | | 5/1991 | Dougall et al. | ............. 358/140 |
| 5,347,599 A | | 9/1994 | Yamashita et al. | ............ 382/54 |
| 5,703,968 A | | 12/1997 | Kuwahara et al. | .......... 382/269 |
| 5,796,437 A | | 8/1998 | Muraji et al. | ................ 348/452 |
| 5,886,745 A | | 3/1999 | Muraji et al. | ................ 348/448 |
| 6,377,307 B1 | * | 4/2002 | Honda | .......................... 348/448 |

FOREIGN PATENT DOCUMENTS

| | | |
|---|---|---|
| JP | 02213289 | 8/1990 |
| JP | 2-293793 | 12/1990 |
| JP | 04343590 | 11/1992 |
| JP | 04364685 | 12/1992 |
| JP | 5-153562 | 6/1993 |
| JP | 7-288778 | 10/1995 |
| JP | 9-37214 | 2/1997 |

OTHER PUBLICATIONS

English Language Abstract for JP Appln. No. 04–343590.
English Language Abstract for JP Appln. No. 04–364685.
English Language Abstract for JP Appln. No. 02–213289.

* cited by examiner

Primary Examiner—Vijay Shankar
(74) Attorney, Agent, or Firm—Greenblum & Bernstein P.L.C.

(57) ABSTRACT

A vertical interpolation circuit interpolates an interpolated pixel with pixels located on upper and lower vertical positions, and outputs a vertical interpolated value. An oblique averaging part averages pixels obliquely located with respect to the interpolated pixel on the basis of an oblique edge angle signal, and outputs the result of calculation as an oblique average. An oblique difference absolute value operation part calculates the absolute value of the difference between the values of the pixels obliquely located with respect to the interpolated pixel on the basis of the oblique edge angle signal, and outputs the result of calculation as an oblique difference absolute value. A mixing part outputs the vertical interpolated value, the oblique average or a mixed value thereof as an interpolated pixel value on the basis of the oblique difference absolute value.

20 Claims, 9 Drawing Sheets

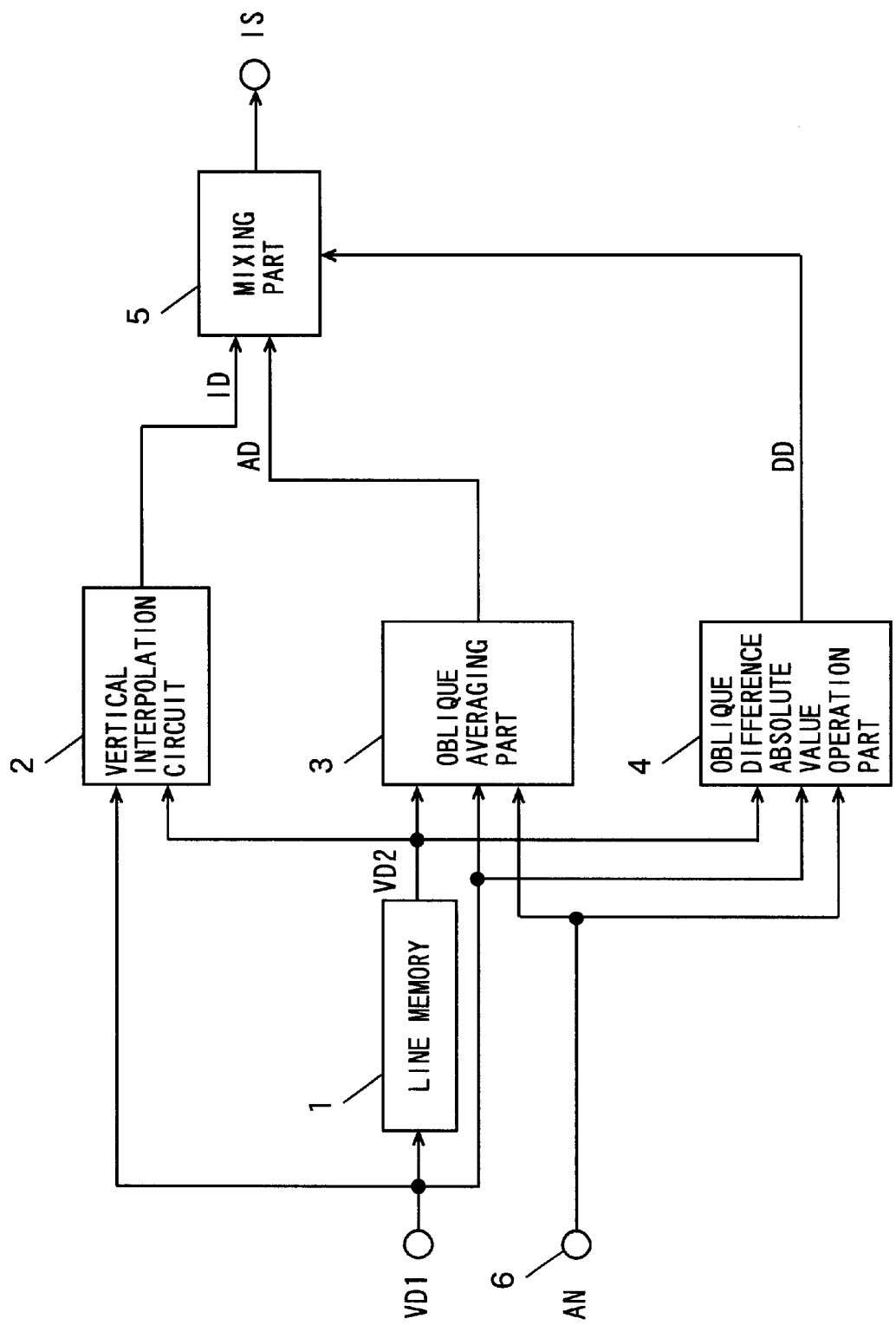

F I G. 1 0
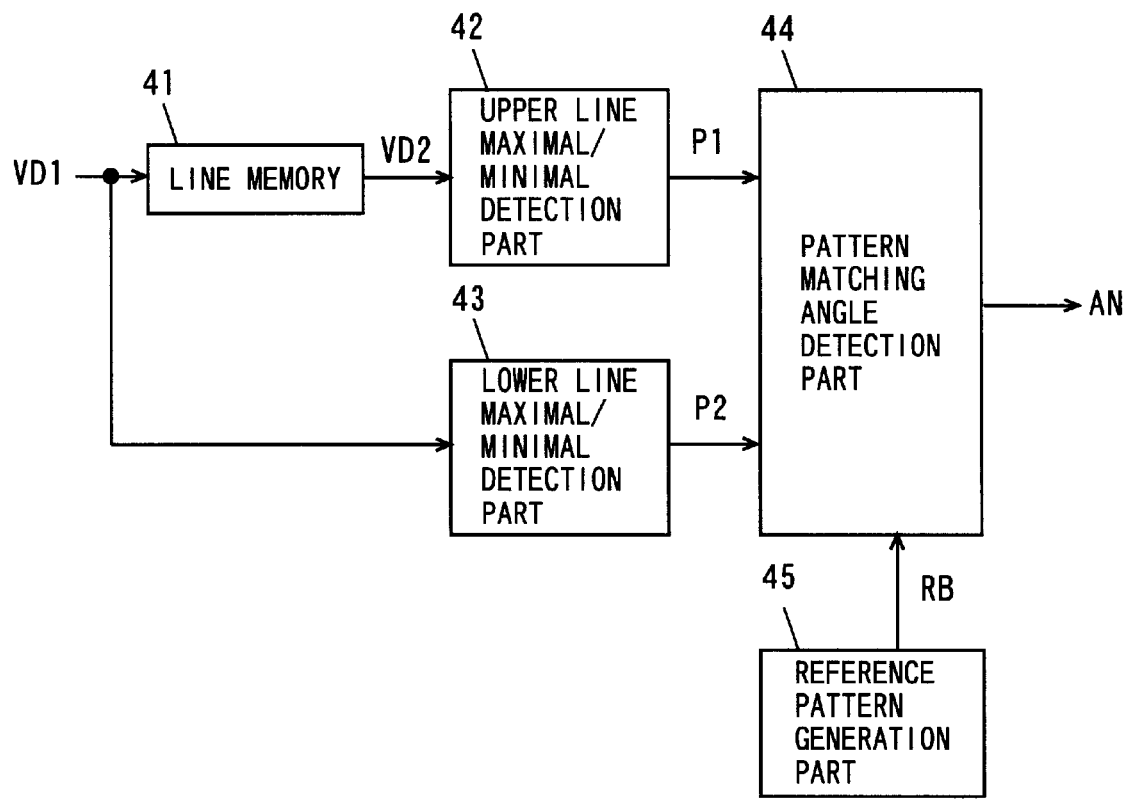
F I G. 1 1
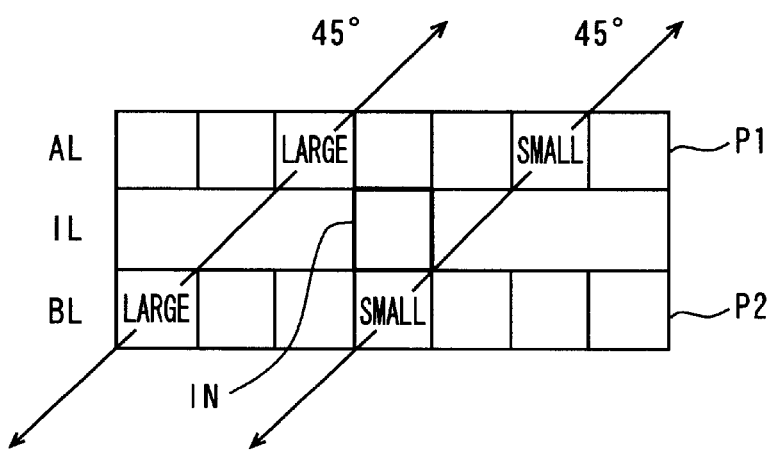

SCANNING LINE INTERPOLATING DEVICE

BACKGROUND OF THE INVENTION

1. Field of the Invention

The present invention relates to a scanning line interpolation equipment for interpolating scanning lines displayed by a video signal.

2. Description of the Background Art

A scanning line interpolation equipment interpolating scanning lines is employed for converting a video signal of an interlaced scanning system to a video signal of a progressive scanning system or increasing the number of scanning lines in the progressive scanning system.

Such a scanning line interpolation equipment calculates the value of a pixel (hereinafter referred to as an interpolated pixel) forming a scanning line (hereinafter referred to as an interpolated scanning line) to be created by interpolation on the basis of the values of pixels of upper and lower scanning lines.

In this case, it is proposed to calculate the value of the interpolated pixel with pixels vertically located with respect to the interpolated pixel in general and to calculate the value of the interpolated pixel with pixels obliquely located with respect to the interpolated pixel in an image having an oblique edge or an image having thin oblique lines. To this end, a correlation determination circuit determining a direction having high correlation in an image displayed by a video signal is employed.

The conventional correlation determination circuit detects the difference value between two vertical pixels and that between two oblique pixels about the interpolated pixel, for determining the angle of the direction having high correlation on the basis of the differences value. In such a method employing the difference value between two pixels, however, the angle may be falsely detected.

Therefore, it is proposed to calculate the value of the interpolated pixel with the vertically located pixels if the difference value between two pixels located in the determined direction is greater than a threshold while calculating the value of the interpolated pixel with the oblique pixels if the difference value between the two pixels located in the determined direction is less than the threshold.

In the aforementioned scanning line interpolation equipment, however, the value of the interpolated pixel is so dispersed that no smooth image can be obtained if the difference value between the two pixels located in the determined direction is approximate to the threshold.

Consider an image having an oblique edge as shown in FIG. 13, for example. It is assumed that the values of two pixels 81 and 82 located above and under an interpolated pixel IN are "0" and "100" respectively, the values of a first pair of oblique pixels 83 and 84 are "0" and "100" respectively, and the values of a second pair of oblique pixels 85 and 86 are "80" and "120" respectively. It is also assumed that a threshold is "40".

In this case, the difference value between the two pixels 81 and 82 located above and under the interpolated pixel IN is "100", that between the first pair of oblique pixels 83 and 84 is "100" and that between the second pair of oblique pixels 85 and 86 is "40", and hence the direction having high correlation is along a straight line connecting the pair of pixels 85 and 86 with each other. In this case, the difference value between the pair of pixels 85 and 86 is not more than the threshold, and hence the value of the interpolated pixel IN is calculated with the oblique pair of pixels 85 and 86. For example, the average "100" of the pair of pixels 85 and 86 defines the value of the interpolated pixel IN.

If the value of the pixel 85 is "75", however, the difference value between the pair of pixels 85 and 86 is greater than the threshold, and hence the value of the interpolated pixel IN is calculated with the two pixels 81 and 82 in the vertical direction. For example, the average "50" between the values of the two pixels 81 and 82 defines the value of the interpolated pixel IN.

Thus, it follows that the value of the interpolated pixel IN varies by "50" when the value of the pixel 85 varies merely by "5". Consequently, no smooth image can be obtained.

SUMMARY OF THE INVENTION

An object of the present invention is to provide a scanning line interpolation equipment capable of smoothly interpolating an image having an oblique edge.

A scanning line interpolation equipment according to an aspect of the present invention, interpolating a scanning line by calculating the value of a pixel to be interpolated on the basis of an input video signal, comprises first interpolation means calculating a first interpolated value by interpolation employing pixels of upper and lower scanning lines vertically located with respect to the pixel to be interpolated, input means inputting a signal indicating the direction of an image with respect to the pixel to be interpolated, difference calculation means calculating the difference value between the values of pixels of upper and lower scanning lines located in the direction indicated by the signal input by the input means with respect to the pixel to be interpolated, second interpolation means calculating a second interpolated value by interpolation employing the pixels of the upper and lower scanning lines located in the direction indicated by the signal input by the input means with respect to the pixel to be interpolated and interpolated value output means outputting the second interpolated value calculated by the second interpolation means as the value of the pixel to be interpolated when the difference value calculated by the difference calculation means is not more than a first value, outputting the first interpolated value calculated by the first interpolation means as the value of the pixel to be interpolated when the difference value calculated by the difference calculation means is not less than a second value greater than the first value, and calculating a third interpolated value by an operation employing the first interpolated value calculated by the first interpolation means and the second interpolated value calculated by the second interpolation means and outputting the third interpolated value as the value of the pixel to be interpolated when the difference value calculated by the difference calculation means is within the range between the first value and the second value.

In the scanning line interpolation equipment according to this aspect of the present invention, the first interpolation means calculates the first interpolated value by the interpolation employing the pixels of the upper and lower scanning lines vertically located with respect to the pixel to be interpolated. Further, the input means inputs the signal indicating the direction of the image with respect to the pixel to be interpolated, and the difference calculation means calculates the difference value between the values of the pixels of the upper and lower scanning lines located in the direction indicated by the input signal with respect to the pixel to be interpolated. The second interpolation means calculates the second interpolated value by the interpolation employing the pixels of the upper and lower scanning lines located in the direction indicated by the input signal with respect to the pixel to be interpolated. The interpolated value output means outputs the second interpolated value as the value of the pixel to be interpolated when the difference value is not more than the first value, outputs the first interpolated value as the value of the pixel to be interpolated when the difference value is in excess of the second value greater than the first value, and calculates the third interpolated value by the operation employing the first and second interpolated values and outputs the third interpolated value as the value of the pixel to be interpolated when the difference value is within the range between the first and second values.

Thus, the value of the pixel to be interpolated is calculated by the operation employing the first interpolated value calculated with the vertical pixels and the second interpolated value calculated with oblique pixels when the difference value between the pixels obliquely located with respect to the pixel to be interpolated is between the first and second values, whereby an image having an oblique edge can be smoothly interpolated.

The interpolated value output means may add the first interpolated value calculated by the first interpolation means and the second interpolated value calculated by the second interpolation means to each other in a ratio according to the difference value calculated by the difference calculation means when the difference value is within the range between the first value and the second value, and outputs the result of addition as the value of the pixel to be interpolated.

In this case, the interpolated value output means adds the first and second interpolated values to each other in the ratio responsive to the difference value when the difference value is between the first and second values, whereby smooth interpolation is enabled.

The interpolated value output means may add the first interpolated value and the second interpolated value to each other so that the ratio of the first interpolated value calculated by the first interpolation means is increased and the ratio of the second interpolated value calculated by the second interpolation means is reduced as the difference value calculated by the difference calculation means approaches the second value from the first value.

In this case, the interpolated value output means adds the first and second interpolated values to each other so that the ratio of the first interpolated value is increased and the ratio of the second interpolated value is reduced as the difference value approaches the second value from the first value, whereby smoother interpolation is enabled.

The difference calculation means may calculate the difference values between the values of a plurality of pixels located in a plurality of directions about the direction indicated by the signal input by the input means with respect to the pixel to be interpolated respectively, and the second interpolation means may calculate a plurality of second interpolated values by interpolation employing the plurality of pixels located in the plurality of directions about the direction indicated by the signal input by the input means with respect to the pixel to be interpolated respectively, while the scanning line interpolation equipment may further comprise minimum value determination means determining the minimum value among the plurality of difference values calculated by the difference calculation means and selection means selecting a second interpolated value corresponding to the difference value determined as the minimum value by the minimum value determination means from the plurality of second interpolated values calculated by the second interpolation means and supplying the selected second interpolated value to the interpolated value output means.

In this case, the scanning line interpolation equipment calculates the difference values between the values of the plurality of pixels located in the plurality of directions about the direction indicated by the input signal with respect to the pixel to be interpolated respectively, and calculates the plurality of second interpolated values respectively by the interpolation employing the plurality of pixels located in the plurality of directions about the direction indicated by the input signal with respect to the pixel to be interpolated respectively. The scanning line interpolation equipment determines the minimum value among the plurality of difference values for selecting the second interpolated value corresponding to the difference value determined as the minimum value from the plurality of second interpolated values and supplies the same to the interpolated value output means.

Thus, false detection of the angle of the image can be corrected by determining the direction having the highest correlation among the plurality of directions and selecting the second interpolated value in the direction having the highest correlation from the second interpolated values in the plurality of directions.

The scanning line interpolation equipment may further comprise detection means detecting the values of pixels vertically located above and under the pixel to be interpolated respectively and intermediate value determination means determining whether or not the second interpolated value calculated by the second interpolation means is between the values detected by the detection means, and the interpolated value output means may output the first interpolated value calculated by the first interpolation means as the value of the pixel to be interpolated regardless of the difference value calculated by the difference calculation means when the intermediate value determination means determines that the second interpolated value is not between the values detected by the detection means.

In this case, the scanning line interpolation equipment detects the values of the pixels vertically located above and under the pixel to be interpolated respectively, and determines whether or not the second interpolated value is between the detected values. When determining that the second interpolated value is not between the detected values, the scanning line interpolation equipment outputs the first interpolated value as the value of the pixel to be interpolated regardless of the oblique difference.

Thus, the scanning line interpolation equipment can be prevented from calculating the value of the pixel to be interpolated with pixels of a false direction when falsely detecting the angle of the image, by employing not the second interpolated value but the first interpolated value if the second interpolated value is not between the pixels located above and under the pixel to be interpolated.

The scanning line interpolation equipment may further comprise vertical difference operation means calculating the difference value between pixels vertically located above and under the pixel to be interpolated, and the interpolated value output means may output the first interpolated value calculated by the first interpolation means regardless of the difference value calculated by the difference calculation means when the difference value calculated by the vertical difference operation means is less than a predetermined value.

In this case, the scanning line interpolation equipment calculates the difference value between the pixels vertically located above and under the pixel to be interpolated, and outputs the first interpolated value as the value of the pixel to be interpolated regardless of the oblique difference value when the vertical difference value is less than the predetermined value.

Thus, deterioration of picture quality resulting from false detection of the angle of the image can be prevented by employing not the second interpolated value but the first interpolated value when the vertical difference value is less than the predetermined value.

The second interpolation means may average the pixels of the upper and lower scanning lines located in the direction indicated by the signal input by the input means with respect to the pixel to be interpolated as the second interpolated value.

In this case, the second interpolated value is defined by the average of the values of the pixels obliquely located with respect to the pixel to be interpolated.

The first value may be zero, and the second value may be a preset threshold.

In this case, the scanning line interpolation equipment outputs the second interpolated value as the value of the pixel to be interpolated when the difference value is zero, outputs the first interpolated value as the value of the pixel to be interpolated when the difference value is in excess of the threshold, and outputs the third interpolated value calculated by the operation employing the first and second interpolated values as the value of the pixel to be interpolated when the difference value is within the range between zero and the threshold.

The scanning line interpolation equipment may further comprise image angle detection means detecting an image angle related to the pixel to be interpolated on the basis of the input video signal and supplying the signal indicating the direction of the image to the input means, and the image angle detection means may include binarized pattern generation means binarizing the input video signal in a predetermined detection area including a plurality of scanning lines and the pixel to be interpolated and generating a binarized pattern, reference pattern generation means generating a binary image having a plurality of directions as a plurality of reference patterns and comparison means comparing the binarized pattern generated by the binarized pattern generation means with each of the plurality of reference patterns generated by the reference pattern generation means and detecting the image angle related to the pixel to be interpolated on the basis of the result of comparison.

In the image angle detection means, the binarized pattern generation means binarizes the input video signal in the predetermined detection area and generates the binarized pattern. The reference pattern generation means generates the binary image having the plurality of directions as the plurality of reference patterns. The comparison means compares the binarized pattern with each of the plurality of reference patterns, and detects the image angle related to the pixel to be interpolated on the basis of the result of comparison.

In this case, the scanning line interpolation equipment can suppress false detection as compared with a case of employing the difference value between two pixels due to comparison of two-dimensional patterns, whereby the angle of the image having an oblique edge can be correctly detected.

When employing two-dimensional reference patterns, detected angles are not restricted to the angle of a straight line connecting pixels located on point-symmetrical positions about the pixel to be interpolated but angles therebetween can also be detected. Therefore, the angles can be detected at smaller intervals without increasing the circuit scale.

The scanning line interpolation equipment may further comprise image angle detection means detecting an image angle related to the pixel to be interpolated on the basis of the input video signal and supplying the signal indicating the direction of the image to the input means, and the image angle detection means may include maximal/minimal pattern generation means generating a maximal/minimal pattern indicating the position of the maximal point or the minimal point of horizontal luminance distribution every scanning line in a predetermined detection area including a plurality of scanning lines and the pixel to be interpolated in the input video signal, reference pattern generation means generating a plurality of reference patterns indicating the positions of the maximal points or the minimal points of horizontal luminance distribution every scanning line in the detection area and comparison means comparing the maximal/minimal pattern generated by the maximal/minimal pattern generation means with each of the plurality of reference patterns generated by the reference pattern generation means and detecting the image angle related to the pixel to be interpolated on the basis of the result of comparison.

In the image angle detection means, the maximal/minimal pattern generation means generates the maximal/minimal pattern indicating the position of the maximal point or the minimal point of the horizontal luminance distribution every scanning line in the predetermined detection area in the input video signal. Further, the reference pattern generation means generates the plurality of reference patterns indicating the maximal points or the minimal points of the horizontal luminance distribution every scanning line in the detection area. The comparison means compares the maximal/minimal pattern with each of the plurality of reference patterns, and detects the image angle related to the pixel to be interpolated on the basis of the result of comparison.

In this case, false detection is suppressed as compared with the case of employing the difference value between two pixels due to comparison of two-dimensional patterns, whereby the angle of an image having thin oblique lines can be correctly detected.

When employing two-dimensional reference patterns, detected angles are not restricted to the angle of a straight line connecting pixels located on point-symmetrical positions about the pixel to be interpolated but angles therebetween can also be detected. Therefore, the angles can be detected at smaller intervals without increasing the circuit scale.

A scanning line interpolation equipment according to another aspect of the present invention, interpolating a scanning line by calculating the value of a pixel to be interpolated on the basis of an input video signal, comprises a first interpolation device that calculates a first interpolated value by interpolation employing pixels of upper and lower scanning lines vertically located with respect to the pixel to be interpolated, an input terminal that receives a signal indicating the direction of an image with respect to the pixel to be interpolated, a difference calculation device that calculates the difference value between the values of pixels of upper and lower scanning lines located in the direction indicated by the signal received in the input terminal with respect to the pixel to be interpolated, a second interpolation device that calculates a second interpolated value by interpolation employing the pixels of the upper and lower scanning lines located in the direction indicated by the signal received in the input terminal with respect to the pixel to be interpolated and an interpolated value output device that outputs the second interpolated value calculated by the second interpolation device as the value of the pixel to be interpolated when the difference value calculated by the difference calculation device is not more than a first value, outputs the first interpolated value calculated by the first interpolation device as the value of the pixel to be interpolated when the difference value calculated by the difference calculation device is not less than a second value greater than the first value, and calculates a third interpolated value by an operation employing the first interpolated value calculated by the first interpolation device and the second interpolated value calculated by the second interpolation device and outputs the third interpolated value as the value of the pixel to be interpolated when the difference value calculated by the difference calculation device is within the range between the first value and the second value.

In the scanning line interpolation equipment according to this aspect of the present invention, the first interpolation device calculates the first interpolated value by the interpolation employing the pixels of the upper and lower scanning lines vertically located with respect to the pixel to be interpolated. The signal indicating the direction of the image with respect to the pixel to be interpolated is input in the input terminal, and the difference calculation device calculates the difference value between the values of the pixels of the upper and lower scanning lines located in the direction indicated by the input signal with respect to the pixel to be interpolated. Further, the second interpolation device calculates the second interpolated value by the interpolation employing the pixels of the upper and lower scanning lines located in the direction indicated by the input signal with respect to the pixel to be interpolated. The interpolated value output device outputs the second interpolated value as the value of the pixel to be interpolated when the difference value is not more than the first value, outputs the first interpolated value as the value of the pixel to be interpolated when the difference value is not less than the second value greater than the first value, and calculates the third interpolated value by the operation employing the first and second interpolated values and outputs the same as the value of the pixel to be interpolated when the difference value is within the range between the first and second values.

Thus, the scanning line interpolation equipment calculates the value of the pixel to be interpolated by the operation employing the first interpolated value calculated with the vertical pixels and the second interpolated value calculated with oblique pixels when the difference value between the pixels obliquely located with respect to the pixel to be interpolated is between the first and second values, whereby an image having an oblique edge can be smoothly interpolated.

The interpolated value output device may add the first interpolated value calculated by the first interpolation device and the second interpolated value calculated by the second interpolation device to each other in a ratio according to the difference value calculated by the difference calculation device when the difference value is within the range between the first value and the second value, and outputs the result of addition as the value of the pixel to be interpolated.

In this case, the scanning line interpolation equipment adds the first and second interpolated values to each other in the ratio responsive to the difference value when the difference value is between the first and second values, whereby smooth interpolation is enabled.

The interpolated value output device may add the first interpolated value and the second interpolated value to each other so that the ratio of the first interpolated value calculated by the first interpolation device is increased and the ratio of the second interpolated value calculated by the second interpolation device is reduced as the difference value calculated by the difference calculation device approaches the second value from the first value.

In this case, the interpolated value output device adds the first and second interpolated values to each other so that the ratio of the first interpolated value is increased and the ratio of the second interpolated value is reduced as the difference value approaches the second value from the first value, whereby smoother interpolation is enabled.

The difference calculation device may calculate the difference values between the values of a plurality of pixels located in a plurality of directions about the direction indicated by the signal received in the input terminal with respect to the pixel to be interpolated respectively and the second interpolation device may calculate a plurality of second interpolated values by interpolation employing the plurality of pixels located in the plurality of directions about the direction indicated by the signal received in the input terminal with respect to the pixel to be interpolated respectively, while the scanning line interpolation equipment may further comprise a minimum value determination device that determines the minimum value among the plurality of difference values calculated by the difference calculation device and a selection device that selectes a second interpolated value corresponding to the difference value determined as the minimum value by the minimum value determination device from the plurality of second interpolated values calculated by the second interpolation device and supplies the selected second interpolated value to the interpolated value output device.

In this case, the scanning line interpolation equipment calculates the difference values between the plurality of pixels located in the plurality of directions about the direction indicated by the input signal with respect to the pixel to be interpolated respectively, and calculates the plurality of second interpolated values respectively by the interpolation employing the plurality of pixels located in the plurality of directions about the direction indicated by the input signal with respect to the pixel to be interpolated respectively. The scanning line interpolation equipment determines the minimum value among the plurality of difference values, for selecting the second interpolated value corresponding to the difference value determined as the minimum value from the plurality of second interpolated values and supplying the same to the interpolated value output device.

Thus, false detection of the angle of the image can be corrected by determining the direction having the highest correlation among the plurality of directions and selecting the second interpolated value in the direction having the highest correlation from the second interpolated values of the plurality of directions.

The scanning line interpolation equipment may further comprise a detection device that detects the values of pixels vertically located above and under the pixel to be interpolated respectively and an intermediate value determination device that determines whether or not the second interpolated value calculated by the second interpolation device is between the values detected by the detection device, and the interpolated value output device may output the first interpolated value calculated by the first interpolation device as the value of the pixel to be interpolated regardless of the difference value calculated by the difference calculation device when the intermediate value determination device determines that the second interpolated value is not between the values detected by the detection device.

In this case, the scanning line interpolation equipment detects the values of the pixels vertically located above and under the pixel to be interpolated respectively and determines whether or not the second interpolated value is between the detected values. When determining that the second interpolated value is not between the detected values, the scanning line interpolation equipment outputs the first interpolated value as the value of the pixel to be detected regardless of the oblique difference value.

Thus, the scanning line interpolation equipment can be prevented from calculating the value of the pixel to be interpolated with pixels of a false direction when falsely detecting the angle of the image, by employing not the second interpolated value but the first interpolated value if the second interpolated value is not between the pixels located above and under the pixel to be interpolated.

The scanning line interpolation equipment may further comprise a vertical difference operation device that calculates the difference value between pixels vertically located above and under the pixel to be interpolated, and the interpolated value output device may output the first interpolated value calculated by the first interpolation device regardless of the difference value calculated by the difference calculation device when the difference value calculated by the vertical difference operation device is less than a predetermined value.

In this case, the scanning line interpolation equipment calculates the difference value between the pixels vertically located above and under the pixel to be interpolated, and outputs the first interpolated value as the value of the pixel to be interpolated regardless of the oblique difference value when the vertical difference value is less than the predetermined value.

Thus, picture quality can be prevented from deterioration resulting from false detection of the angle of the image by employing not the second interpolated value but the first interpolated value when the vertical difference value is smaller than the predetermined value.

The second interpolation device may average the pixels of the upper and lower scanning lines located in the direction indicated by the signal received in the input terminal with respect to the pixel to be interpolated as the second interpolated value.

In this case, the second interpolated value is defined by the average of the values of pixels obliquely located with respect to the pixel to be interpolated.

The first value may be zero, and the second value may be a preset threshold.

In this case, the scanning line interpolation equipment outputs the second interpolated value as the value of the pixel to be interpolated when the difference value is zero, outputs the first interpolated value as the value of the pixel to be interpolated when the difference value is in excess of the threshold, and outputs the third interpolated value calculated by the operation employing the first and second interpolated values as the value of the pixel to be interpolated when the difference value is within the range between zero and the threshold.

The scanning line interpolation equipment may further comprise an image angle detection device that detects an image angle related to the pixel to be interpolated on the basis of the input video signal and supplies the signal indicating the direction of the image to the input terminal, and the image angle detection device may include a binarized pattern generation device that binarizes the input video signal in a predetermined detection area including a plurality of scanning lines and the pixel to be interpolated and generates a binarized pattern, a reference pattern generation device that generates a binary image having a plurality of directions as a plurality of reference patterns and a comparison device that compares the binarized pattern generated by the binarized pattern generation device with each of the plurality of reference patterns generated by the reference pattern generation device and detects the image angle related to the pixel to be interpolated on the basis of the result of comparison.

In the image angle detection device, the binarized pattern generation device binarizes the input video signal in the predetermined detection area and generates the binarized pattern. The reference pattern generation device generates the binarized image having the plurality of directions as the plurality reference patterns. The comparison device compares the binarized pattern with each of the plurality of reference patterns and detects the image angle related to the pixel to be interpolated on the basis of the result of comparison.

In this case, false detection is suppressed as compared with a case of employing the difference value between two pixels due to comparison of two-dimensional patterns, whereby the angle of an image having an oblique edge can be correctly detected.

When employing two-dimensional reference patterns, detected angles are not restricted to the angle of a straight line connecting pixels located on point-symmetrical positions about the pixel to be interpolated but angles therebetween can also be detected. Therefore, the angles can be detected at smaller intervals without increasing the circuit scale.

The scanning line interpolation equipment may further comprise an image angle detection device that detects an image angle related to the pixel to be interpolated on the basis of the input video signal and supplies the signal indicating the direction of the image to the input terminal, and the image angle detection device may include a maximal/minimal pattern generation device that generates a maximal/minimal pattern indicating the position of the maximal point or the minimal point of horizontal luminance distribution every scanning line in a predetermined detection area including a plurality of scanning lines and the pixel to be interpolated in the input video signal, a reference pattern generation device that generates a plurality of reference patterns indicating the positions of the maximal points or the minimal points of horizontal luminance distribution every scanning line in the detection area and a comparison device compares the maximal/minimal pattern generated by the maximal/minimal pattern generation device with each of the plurality of reference patterns generated by the reference pattern generation device and detects the image angle related to the pixel to be interpolated on the basis of the result of comparison.

In the image angle detection device, the maximal/minimal pattern generation device generates the maximal/minimal pattern indicating the position of the maximal point or the minimal point of the horizontal luminance distribution every scanning line in the predetermined detection area in the input video signal. The reference pattern generation device generates the plurality of reference patterns indicating the positions of the maximal points or the minimal points of the horizontal luminance distribution every scanning line in the detection area. The comparison device compares the maximal/minimal pattern with each of the plurality of reference patterns, and detects the image angle related to the pixel to be interpolated on the basis of the result of comparison.

In this case, false detection is suppressed as compared with a case of employing the difference value between two pixels due to comparison of two-dimensional patterns, and the angle of an image having thin oblique lines can be correctly detected.

When employing two-dimensional reference patterns, detected angles are not restricted to the angle of a straight line connecting pixels located on point-symmetrical positions about the pixel to be interpolated but angles therebetween can also be detected. Therefore, the angles can be detected at smaller intervals without increasing the circuit scale.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the structure of a scanning line interpolation equipment according to a first embodiment of the present invention;

FIGS. 9(a) to 9(e) are model diagrams showing exemplary reference patterns generated from a reference pattern generation part shown in FIG. 7;

FIG. 10 is a block diagram showing another exemplary structure of the image angle detector outputting the angle signal;

FIG. 11 is a model diagram showing an exemplary maximal/minimal pattern output from an upper line maximal/minimal detection part and a lower line maximal/minimal detection part shown in FIG. 10;

Figure 2:
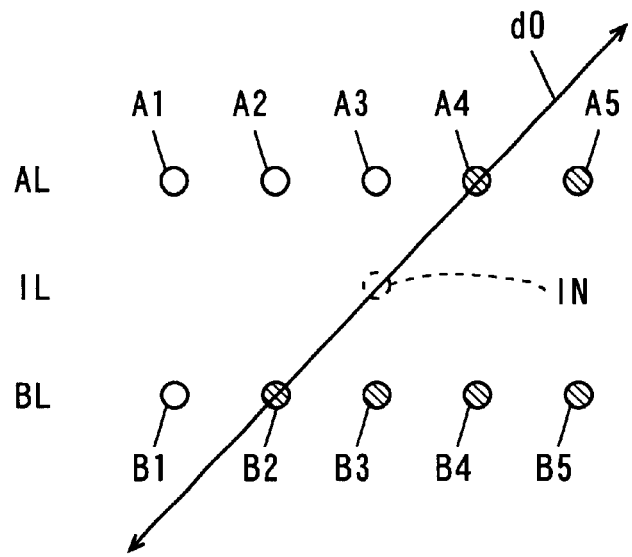
FIG. 2 is a model diagram for illustrating the relation between the angle of an image and pixels employed for interpolation.

DESCRIPTION OF THE PREFERRED EMBODIMENTS (1) First Embodiment

FIG. 1 is a block diagram showing the structure of a scanning line interpolation equipment according to a first embodiment of the present invention.

The scanning line interpolation equipment shown in FIG. 1 includes a line memory 1, a vertical interpolation circuit 2, an oblique averaging part 3, an oblique difference absolute value operation part 4 and a mixing part 5.

A video signal VD1 is input in the line memory 1, the vertical interpolation circuit 2, the oblique averaging part 3 and the oblique difference absolute value operation part 4.

An angle signal AN is input in the oblique averaging part 3 and the oblique difference absolute value operation part 4 through an input terminal 6. An image angle detector described later supplies the angle signal AN indicating the angle of an oblique image such as an image having an oblique edge or an image having thin oblique lines.

The line memory 1 delays the input video signal VD1 by one line (one scanning line) and outputs a video signal VD2. The video signal VD2 output from the line memory 1 is supplied to the vertical interpolation circuit 2, the oblique averaging part 3 and the oblique difference absolute value operation part 4.

In this embodiment, it is assumed that the video signals VD1 and VD2 have luminance of 256 gradations. In other words, the minimum and maximum values of the luminance of the video signals VD1 and VD2 are "0" and "255" respectively.

The vertical interpolation circuit 2 performs interpolation (hereinafter referred to as vertical interpolation) on an interpolated pixel (a pixel to be created by interpolation) with pixels vertically located above and under the interpolated pixel on the basis of the input video signal VD1 and the video signal VD2 output from the line memory 1, and outputs a vertical interpolated value ID. For example, the vertical interpolation circuit 2 averages the values of the pixels vertically located above and under the interpolated pixel as the vertical interpolated value ID. A well-known interpolation circuit can be employed as the vertical interpolation circuit 2. For example, the vertical interpolation circuit 2 may be formed by an interpolation circuit employing a median filter selecting an intermediate value from the values of a plurality of pixels and outputting the same.

The oblique averaging part 3 averages the values of pixels of upper and lower scanning lines obliquely located with respect to the interpolated pixel on the basis of the input video signal VD1, the video signal VD2 output from the line memory 1 and the angle signal AN, and outputs the result of this averaging as an oblique average AD. This calculation of the oblique average AD performed by the oblique averaging part 3 is referred to as oblique interpolation.

The oblique difference absolute value operation part 4 calculates the absolute value of the difference between the values of pixels obliquely located with respect to the interpolated pixel on the basis of the input video signal VD1, the video signal VD2 output from the line memory 1 and the angle signal AN, and outputs the result of this calculation as an oblique difference absolute value DD.

The mixing part 5 outputs the vertical interpolated value ID output from the vertical interpolation circuit 2, the oblique average AD output from the oblique averaging part 3 or a mixed value thereof as the value (hereinafter referred to as an interpolated pixel value) IS of the interpolated pixel on the basis of the oblique difference absolute value DD output from the oblique difference absolute value operation part 4. Operations of the mixing part 5 are described later in detail.

According to this embodiment, the vertical interpolation circuit 2 corresponds to the first interpolation means or the first interpolation unit, the input terminal 6 receiving the angle signal AN corresponds to the input means or the input terminal, the oblique difference absolute value calculation part 4 corresponds to the difference calculation means or the difference calculation unit, the oblique averaging part 3 corresponds to the second interpolation means or the second interpolation unit, and the mixing part 5 corresponds to the interpolated value output means or the interpolated value output unit.

FIG. 2 is a model diagram for illustrating the relation between the angle of an image and pixels employed for interpolation.

Referring to FIG. 2, symbol IL denotes an interpolated scanning line, symbol AL denotes a scanning line located above the interpolated scanning line IL, and symbol BL denotes a scanning line located under the interpolated scanning line IL. The upper scanning line AL includes pixels A1 to A5, and the lower scanning line BL includes pixels B1 to B5. Symbol IN denotes an interpolated pixel.

Referring to FIG. 2, the angle of the image is about 45° with respect to the horizontal line, as shown by arrow d0. In this case, the angle signal AN shown in FIG. 1 indicates the angle of 45°. The oblique averaging part 3 shown in FIG. 1 outputs the average of the luminance values of the pixels A4 and B2 of the upper and lower scanning lines AL and BL located in the direction of the angle 45° about the interpolated pixel IN as the oblique average AD. The oblique difference absolute value operation part 4 shown in FIG. 1 outputs the absolute value of the difference between the luminance values of the pixels A4 and B2 of the upper and lower scanning lines AL and BL located in the direction of the angle 45° about the interpolated pixel IN.

Figure 3:
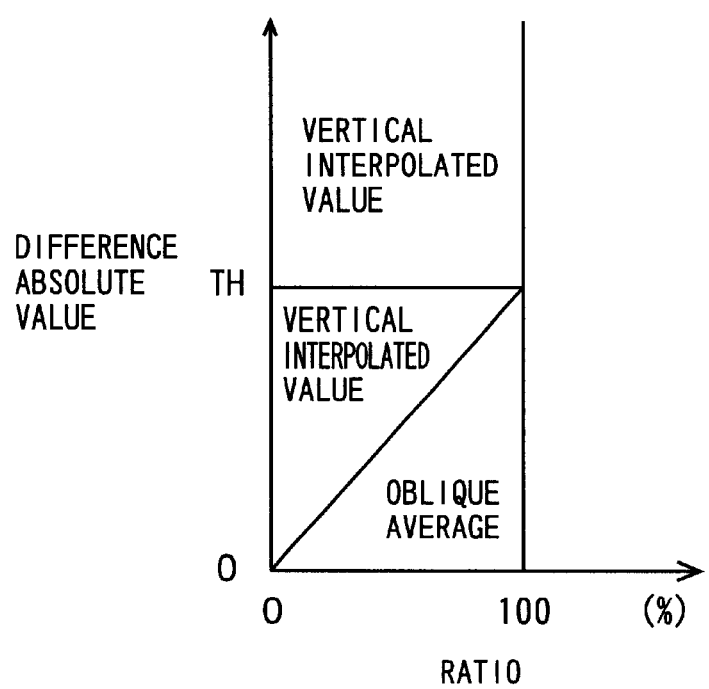
FIG. 3 is a model diagram for illustrating operations of a mixing part shown in FIG. 1.

FIG. 3 is a model diagram for illustrating the operations of the mixing part 5 shown in FIG. 1.

As shown in FIG. 3, the mixing part 5 outputs the oblique average AD output from the oblique averaging part 3 as the interpolated pixel value IS when the oblique difference absolute value DD output from the oblique difference absolute value operation part 4 is zero. When the oblique difference absolute value DD output from the oblique difference absolute vale operation part 4 is in excess of a previously set threshold TH, the mixing part 5 outputs the vertical interpolated value ID output from the vertical interpolation circuit 2 as the interpolated pixel value IS. When the oblique difference absolute value DD output from the oblique difference absolute value operation part 4 is between zero and the threshold TH, the mixing part 5 mixes the oblique average AD output from the oblique averaging part 3 and the vertical interpolated value ID output from the vertical averaging part 3 with each other in a ratio responsive to the oblique difference absolute value DD, and outputs the mixed value as the interpolated pixel value IS.

Figure 4:
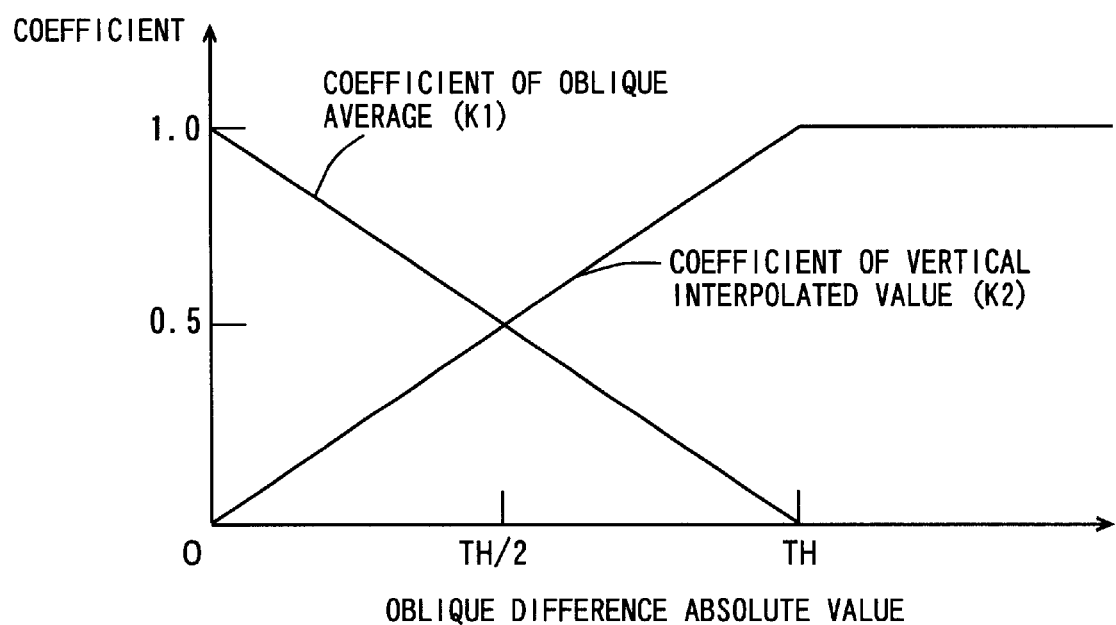
FIG. 4 is a model diagram showing the relation between an oblique difference absolute value and coefficients of an oblique average and a vertical interpolated value.

FIG. 4 is a model diagram showing the relation between the oblique difference absolute value DD and coefficients K1 and K2 of the vertical interpolated value ID and the oblique average AD.

When the oblique difference absolute value DD is between zero and the threshold TH, the mixing part 5 shown in FIG. 1 calculates the mixed value CX as follows:

$$CX = K1 \cdot AD + K2 \cdot ID \quad (1)$$

In the above equation (1), K1 and K2 represent the coefficients of the oblique average and the vertical interpolated value respectively. The coefficients K1 and K2 are so set that K1+K2 regularly reaches 1. Referring to FIG. 4, the horizontal axis shows the oblique difference absolute value DD, and the vertical axis shows the coefficients K1 and K2.

As shown in FIG. 4, the coefficient K1 of the oblique average AD reaches 1.0 when the oblique difference absolute value DD is zero, is reduced as the oblique difference absolute value DD is increased, and reaches zero when the oblique difference absolute value DD is at the threshold TH. On the other hand, the coefficient K2 of the vertical interpolated value ID reaches zero when the oblique difference absolute value DD is zero, is increased as the oblique difference absolute value DD is increased, and reaches 1.0 when the oblique difference absolute value DD is at the threshold TH.

While the coefficients K1 and K2 of the oblique average AD and the vertical interpolated value ID are linearly reduced and increased with respect to the oblique difference absolute value DD in the example shown in FIG. 4, the present invention is not restricted to this but the coefficients K1 and K2 of the oblique average AD and the vertical interpolated value ID may alternatively be changed in a curved manner.

In the scanning line interpolation equipment according to this embodiment, the mixing part 5 mixes the vertical interpolated value ID and the oblique average AD with each other while varying the ratio therebetween in response to the oblique difference absolute value DD and outputs the mixed value CX as the interpolated pixel value IS when the oblique difference absolute value DD is between zero and the threshold TH, whereby smooth interpolation is enabled in the image having an oblique edge.

While the mixing part 5 outputs the oblique average AD as the interpolated pixel value IS only when the oblique difference absolute value DD is zero, the present invention is not restricted to this but the mixing part 5 may alternatively be set to output the oblique average AD as the interpolated pixel value IS at an arbitrary value greater than zero and less than the threshold TH.

(2) Second Embodiment

Figure 5:
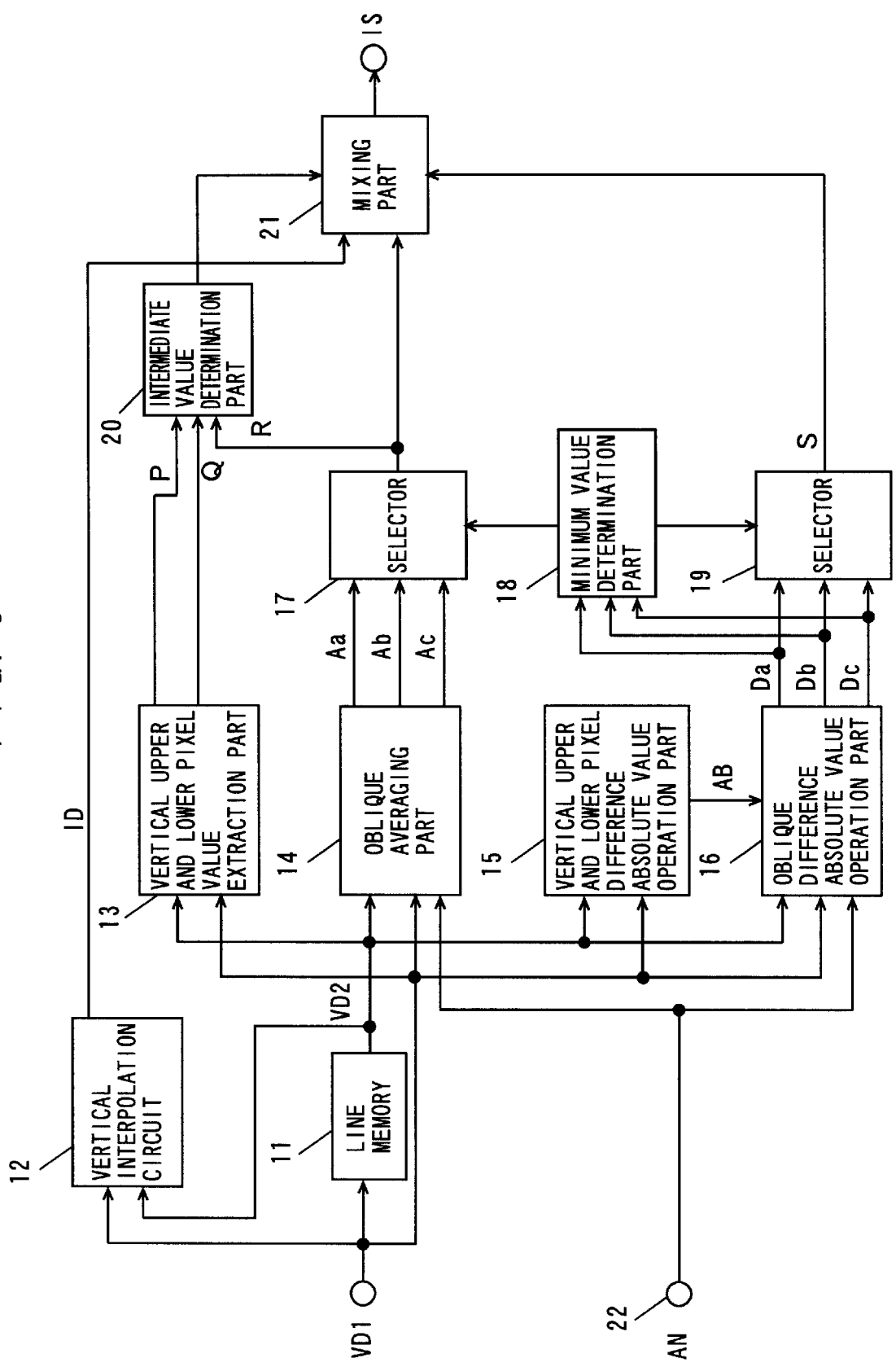
FIG. 5 is a block diagram showing the structure of a scanning line interpolation equipment according to a second embodiment of the present invention.

FIG. 5 is a block diagram showing the structure of a scanning line interpolation equipment according to a second embodiment of the present invention.

The scanning line interpolation equipment shown in FIG. 5 includes a line memory 11, a vertical interpolation circuit 12, a vertical upper and lower pixel value extraction part 13, an oblique averaging part 14, a vertical upper and lower pixel difference absolute value operation part 15, an oblique difference absolute value operation part 16, a selector 17, a minimum value determination part 18, another selector 19, an intermediate value determination part 20 and a mixing part 21.

A video signal VD1 is input in the line memory 11, the vertical interpolation circuit 12, the vertical upper and lower pixel value extraction part 13, the oblique averaging part 14, the vertical upper and lower pixel difference absolute value operation part 15 and the oblique difference absolute value operation part 16. An angle signal AN is input in the oblique averaging part 14 and the oblique difference absolute value operation part 16 through an input terminal 22.

The line memory 11 delays the input video signal VD1 by one line (one scanning line) and outputs a video signal VD2. The video signal VD2 output from the line memory 11 is supplied to the vertical interpolation circuit 12, the vertical upper and lower pixel value extraction part 13, the oblique averaging part 14, the vertical upper and lower pixel difference absolute value operation part 15 and the oblique difference absolute value operation part 16.

Also in this embodiment, it is assumed that the video signals VD1 and VD2 have luminance of 256 gradations. In other words, the minimum and maximum values of the luminance of the video signals VD1 and VD2 are "0" and "255" respectively.

Similarly to the vertical interpolation circuit 2 shown in FIG. 1, the vertical interpolation circuit 12 vertically interpolates an interpolated pixel with pixels vertically located above and under the same on the basis of the input video signal VD1 and the video signal VD2 output from the line memory 11 and outputs a vertical interpolated value ID.

The vertical upper and lower pixel value extraction part 13 outputs the values of pixels of upper and lower scanning lines vertically located with respect to the interpolated pixel as a vertical upper pixel value P and a vertical lower pixel value Q respectively on the basis of the input video signal VD1 and the video signal VD2 output from the line memory 11.

The oblique averaging part 14 averages the values of pixels of upper and lower scanning lines located in a direction (hereinafter referred to as a direction 0) of an angle indicated by the angle signal AN with respect to the interpolated pixel on the basis of the input video signal VD1, the video signal VD2 output from the line memory 11 and the angle signal AN, and outputs the result of this calculation as an oblique average Ab. The oblique averaging part 14 further averages the values of pixels of upper and lower scanning lines located in a direction (hereinafter referred to as a direction −1) of an angle less than the angle indicated by the angle signal AN by 1 and outputs the result of this calculation as another oblique average Aa, while averaging the values of upper and lower scanning lines located in a direction (hereinafter referred to as a direction +1) greater than the angle indicated by the angle signal AN by 1 and outputting the result of this calculation as still another oblique average Ac.

The vertical upper and lower pixel difference absolute value operation part 15 calculates the absolute value of the difference between the values of the pixels of the upper and lower pixels vertically located with respect to the interpolated pixel on the basis of the input video signal VD1 and the video signal VD2 output from the line memory 11, and outputs the result as a vertical difference absolute value AB.

The oblique difference absolute value operation part 16 calculates the absolute value of the difference between the pixels of the values of the upper and lower scanning lines located in the direction (direction zero) of the angle indicated by the angle signal AN with respect to the interpolated pixel on the basis of the input video signal VD1, the video signal VD2 output from the lie memory 11 and the angle signal AN, and outputs the result of this calculation as an oblique difference absolute value Db. The oblique difference absolute value operation part 16 further calculates the absolute value of the difference between the values of the pixels of the upper and lower scanning lines located in the direction (direction −1) of the angle less than the angle indicated by the angle signal AN by 1 and outputs the result of this calculation as an oblique difference absolute value Da, while calculating the absolute value of the difference between the values of the pixels of the upper and lower scanning lines located in the direction (direction +1) greater than the angle indicated by the angle signal AN by 1 and outputting the result of this calculation as an oblique difference absolute value Dc.

The minimum value determination part 18 determines the minimum value of the oblique difference absolute values Da, Db and Dc output from the oblique difference absolute value operation part 16, and supplies the result of determination indicating the minimum angle to the selectors 17 and 19.

On the basis of the result of determination supplied from the minimum value determination part 18, the selector 17 selects the oblique average corresponding to the angle indicated by the result of determination from the oblique averages Aa, Ab and Ac output from the oblique averaging part 14, and outputs the selected average as an oblique average R.

On the basis of the result of determination supplied from the minimum value determination part 18, the selector 19 selects the oblique difference absolute value corresponding to the angle indicated by the result of determination from the oblique difference absolute values Da, Db and Dc output from the oblique difference absolute value operation part 16, and outputs the selected oblique difference absolute value as an oblique difference absolute value S.

The intermediate value determination part 20 determines the intermediate value of the vertical upper and lower pixel values P and Q output from the vertical upper and lower pixel value extraction part 13 and the oblique average R output from the selector 17, and outputs the result of determination to the mixing part 21.

On the basis of the oblique difference absolute value S output from the selector 19, the mixing part 21 outputs the vertical interpolated value ID output from the vertical interpolation circuit 12, the oblique average R output from the selector 17 or a mixed value thereof as an interpolated pixel value IS. The mixed value of the oblique difference absolute value S and the vertical interpolated value ID is calculated by a method similar to that for calculating the mixed value of the oblique average AD and the vertical interpolated value ID shown in FIGS. 2 and 3.

When the result of determination of the intermediate value determination 20 is not the oblique average R, i.e. when the oblique average R is not the intermediate value between the vertical upper pixel value P and the vertical lower pixel value Q, the mixing part 21 outputs the vertical interpolated value ID output from the vertical interpolation circuit 12 as the interpolated pixel value IS. Thus, not oblique interpolation but vertical interpolation is performed when the oblique average R is not between the pixels above and under the interpolated pixel.

When the vertical difference absolute value AB supplied from the vertical upper and lower pixel difference absolute value operation part 15 is less than a predetermined value, the oblique difference absolute value operation part 16 outputs the maximum luminance "255" as the oblique difference absolute values Da, Db and Dc respectively. Thus, the oblique difference absolute value S output from the selector 19 reaches the maximum value "255". Therefore, the mixing part 21 outputs the vertical interpolated value ID output from the vertical interpolation circuit 12 as the interpolated pixel value IS. In other words, not oblique interpolation but vertical interpolation is performed when the absolute value of the difference between the pixels above and under the interpolated pixel is small.

According to this embodiment, the vertical interpolation circuit 12 corresponds to the first interpolation means or the first interpolation unit, the input terminal 22 receiving the angle signal AN corresponds to the input means or the input terminal, the oblique difference absolute value operation part 16 corresponds to the difference calculation means or the difference calculation unit, the oblique averaging part 14 corresponds to the second interpolation means or the second interpolation unit, and the mixing part 22 corresponds to the interpolated value output means or the interpolated value output unit.

The minimum value determination part 18 corresponds to the minimum value determination means or the minimum value determination unit, the selector 17 corresponds to the selection means or the selection unit, the vertical upper and lower pixel value extraction part 13 corresponds to the detection means or the detection unit, the intermediate value determination part 20 corresponds to the intermediate value determination means or the intermediate value determination unit, and the vertical upper and lower pixel difference absolute value operation part 15 corresponds to the vertical difference operation means or the vertical difference operation unit.

Figure 6:
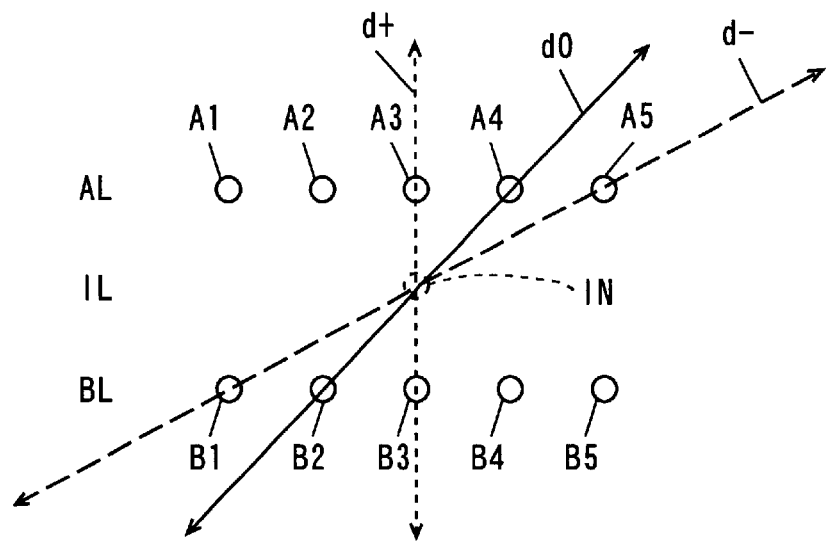
FIG. 6 is a model diagram for illustrating oblique interpolation by an oblique averaging part and an oblique difference absolute value operation part of the scanning line interpolation equipment shown in FIG. 5.

FIG. 6 is a model diagram for illustrating oblique interpolation by the oblique averaging part 14 and the oblique difference absolute value operation part 16 shown in FIG. 5.

Referring to FIG. 6, symbol IL denotes an interpolated scanning line, symbol AL denotes a scanning line located above the interpolated scanning line IL, and symbol BL denotes a scanning line located under the interpolated scanning line IL. The upper scanning line AL includes pixels A1 to A5, and the lower scanning line BL includes pixels B1 to B5. Symbol IN denotes an interpolated pixel.

Referring to FIG. 6, further, arrow d0 shows the angle of the image indicated by the angle signal AN shown in FIG. 5, arrow d− denotes the direction −1 and arrow d+ denotes the direction +1.

The oblique averaging part 14 shown in FIG. 5 outputs the average luminance of the pixels A4 and B2 of the upper and lower scanning lines AL and BL located along arrow d0 about the interpolated pixel IN as the oblique average Ab, outputs the average luminance of the pixels A5 and B1 of the upper and lower scanning lines AL and BL located along arrow d− as the oblique average Aa, and outputs the average luminance of the pixels A3 and B3 of the upper and lower scanning lies AL and BL located along arrow d+ as the oblique average Ac. The oblique difference absolute value operation part 14 shown in FIG. 5 further outputs the absolute value of the difference between the luminance values of the pixels A4 and B2 of the upper and lower scanning lines AL and BL located along arrow d0 about the interpolated pixel IN as the oblique difference absolute value Db, outputs the absolute value of the difference between the luminance values of the pixels A5 and B1 of the upper and lower scanning lines AL and BL located along arrow d− as the oblique difference absolute value Da, and outputs the absolute value of the difference between the luminance values of the pixels A3 a B3 of the upper and lower scanning lines AL and BL located along arrow d+ as the oblique difference absolute value Dc.

The scanning line interpolation equipment according to this embodiment mixes the vertical interpolated value ID and the oblique difference absolute value R with each other while varying the ratio therebetween in response to the oblique difference absolute value S when the oblique difference absolute value S is between zero and a threshold TH and outputs the result as the interpolated pixel value IS, whereby an image having an oblique edge can be smoothly interpolated.

Further, the scanning line interpolation circuit determines the direction having the highest correlation among the direction indicated by the angle signal AN and the directions −1 and +1 on the basis of the oblique difference absolute values Da, Db and Dc calculated by the oblique difference absolute value operation part 16 and selects the oblique average corresponding to the direction having the highest correlation from the oblique averages Aa, Ab and Ac calculated by the oblique averaging part 14, whereby false detection of the angle of the image can be corrected.

In the image having an oblique edge, the value of the interpolated pixel is between the values of the upper and lower pixels. If the oblique average R is not between the values of the pixels located above and under the interpolated pixel, not oblique interpolation but vertical interpolation is so performed that the interpolated pixel value IS can be prevented from calculation on the basis of pixels located in a false direction when the angle of the image is falsely detected.

In the image having an oblique edge, further, the difference between the pixels vertically located above and under the interpolated pixel is large. If the absolute value of the difference between the pixels located above and under the interpolated pixel is small, therefore, not oblique interpolation but vertical interpolation is so performed that the picture quality can be prevented from deterioration caused by false detection of the angle of the image.

Figure 7:
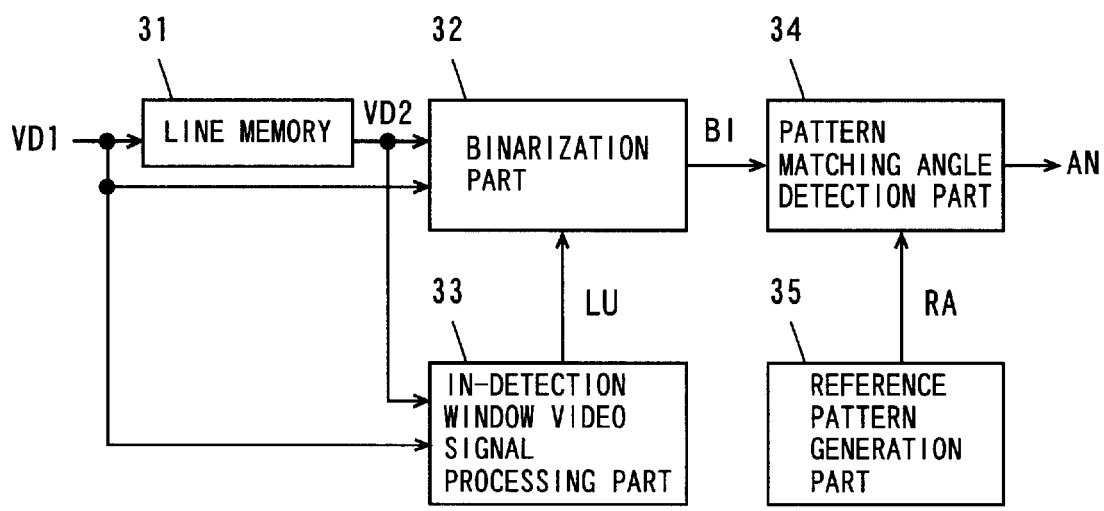
FIG. 7 is a block diagram showing an exemplary structure of an image angle detector outputting an angle signal.

FIG. 7 is a block diagram showing an exemplary structure of the image angle detector outputting the angle signal AN.

The image angle detector shown in FIG. 7 includes a line memory 31, a binarization part 32, an in-detection window video signal processing part 33, a pattern matching angle detection part 34 and a reference pattern generation part 35.

The video signal VD1 is input in the line memory 31, the binarization part 32 and the in-detection window video signal processing part 33. The line memory 31 delays the input video signal VD1 by one line (one scanning line) and outputs the video signal VD2. The video signal VD2 output from the line memory 31 is supplied to the binarization part 32 and the in-detection window video signal processing part 33.

The binarization part 32 binarizes the input video signal VD1 and the video signal VD2 output from the line memory 31 with a threshold of an average luminance value LU supplied from the in-detection window video signal processing part 33 described later, and outputs a binarized pattern BI formed by "1" and "2". The binarized pattern BI has the size of a detection window.

The detection window is a rectangular area of 7 by 2 pixels including seven pixels of the video signal VD1 and seven pixels of the video signal VD2, a rectangular area of 15 by 2 pixels including 15 pixels of the video signal VD1 and 15 pixels of the video signal VD2 or the like, for example. In the following description, it is assumed that the size of the detection window is 7 by 2 pixels. In this case, the size of the binarized pattern BI corresponds to 7 by 2 pixels.

The in-detection window video signal processing part 33 sets the detection window for the input video signal VD1 and the video signal VD2 output from the line memory 31 and averages the luminance values of the video signals VD1 and VD2 in the detection window for supplying the average luminance value LU to the binarization part 32 as the threshold for binarization.

The reference pattern generation part 35 generates a plurality of reference patterns RA formed by "1" and "0" and supplies the same to the pattern matching angle detection part 34. Each reference pattern RA is equal in size to the detection window.

The pattern matching angle detection part 34 compares the binarized pattern BI supplied from the binarization part 32 with each of the plurality of reference patterns RA supplied from the reference pattern generation part 35, and outputs the angle of the reference pattern RA matching with the binarized pattern BI as the angle signal AN. The operation of comparing the binarized pattern BI and each reference pattern RA with each other is hereinafter referred to as pattern matching.

Figure 8:
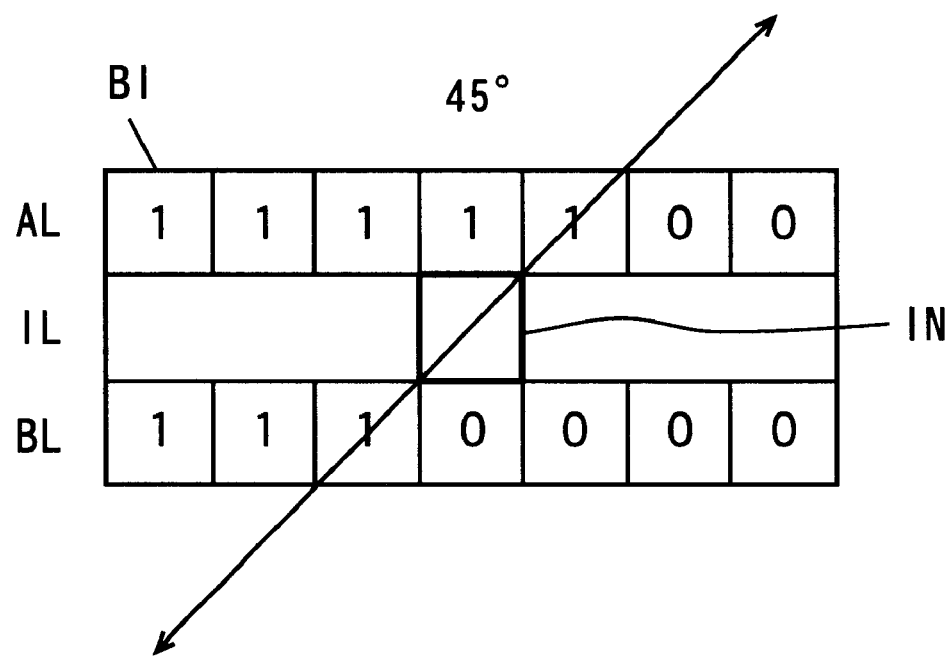
FIG. 8 illustrates exemplary binarized patterns output from a binarization part shown in FIG. 7.

FIG. 8 is a model diagram showing an exemplary binarized pattern BI output from the binarization part 32 shown in FIG. 7.

Referring to FIG. 8, symbol IN denotes an interpolated pixel, and symbol IL denotes an interpolated scanning line. Symbols AL and BL denote scanning lines located above and under the interpolated scanning line IL respectively.

FIG. 8 shows portions (dark portions) having low luminance with "0", while showing portions (light portions) having high luminance with "1". In the binarized pattern BI, the angle of the edge of the image is 45°. It is assumed that the horizontal angle is zero and the oblique upper right angle is positive.

Figure 9:
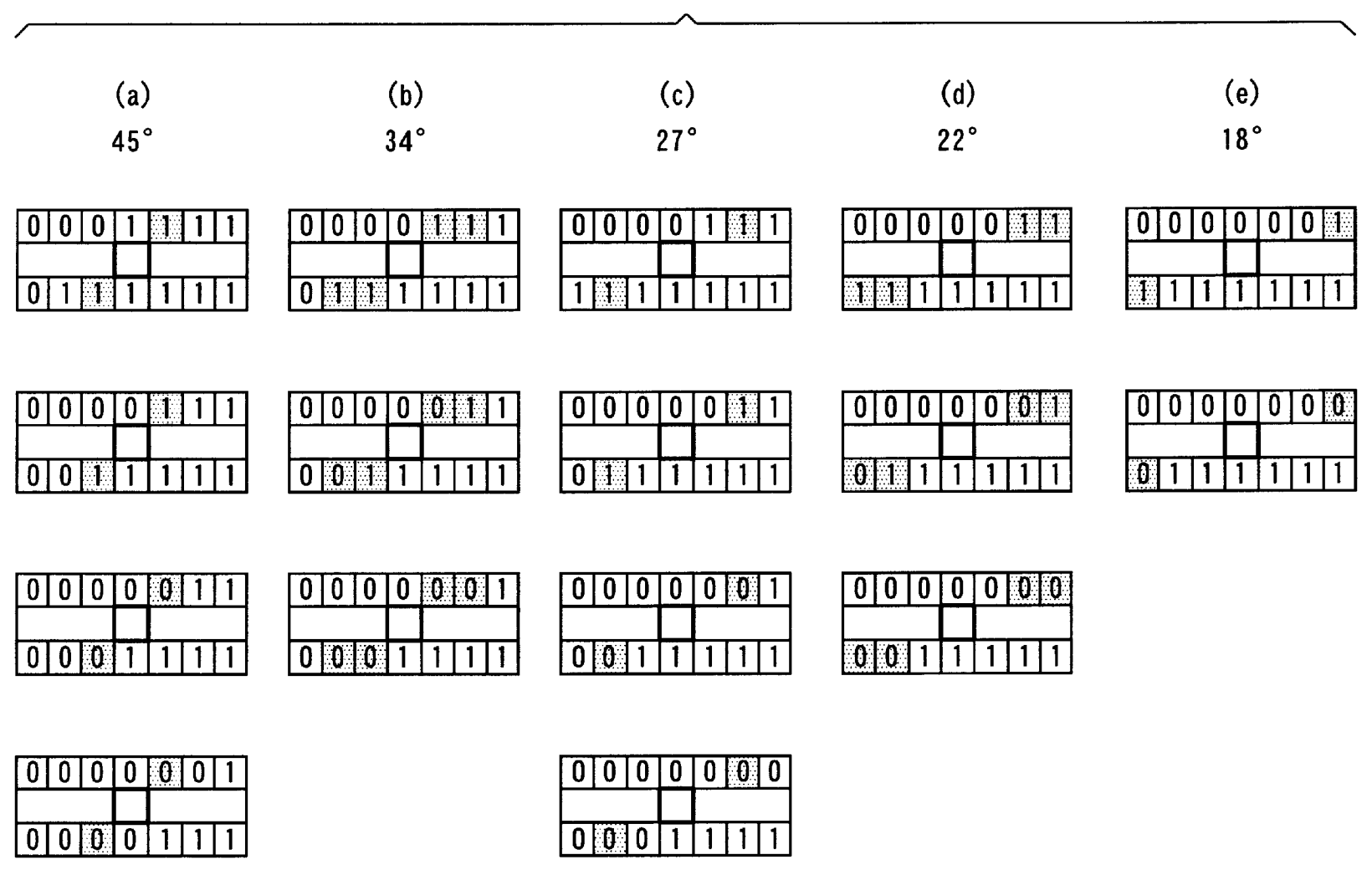

FIGS. 9(*a*) to 9(*e*) are model diagrams showing exemplary reference patterns generated by the reference pattern generation part 35 shown in FIG. 7. Referring to FIGS. 9(*a*) to 9(*e*), halftone-dot squares show pixels of upper and lower scanning lines employed for calculating values of interpolated pixels shown by thick lines.

FIGS. 9(*a*), 9(*b*), 9(*c*), 9(*d*) and 9(*e*) show reference patterns of 45°, 34°, 27°, 22° and 18° respectively. Referring to FIGS. 9(*a*) to 9(*e*), upper left portions are dark while lower right portions are light.

As shown in FIGS. 9(*a*) to 9(*e*), not only the angles of straight lines connecting pixels located on point-symmetrical positions about the interpolated pixel but also angles between these angles can be set in the reference patterns according to two-dimensional luminance distribution. For example, the angles 34° and 22° between the angles 45°, 27° and 18° can be set.

For example, the binarized pattern BI shown in FIG. 8 matches with the reference pattern shown in FIG. 9(*a*). In this case, the pattern matching angle detection part 35 shown in FIG. 7 outputs an angle signal AN indicating 45°.

The image angle detector shown in FIG. 7 can detect the angle of the image with a small circuit scale by converting the luminance distribution of the video signals VD1 and VD2 in the detection window to the binarized pattern BI and pattern-matching the binarized pattern BI with the previously set plurality of reference patterns RA.

In this case, the average luminance value in the detection window is employed as the threshold for binarization, whereby the binarized pattern BI can be created regardless of the luminance level of the image without externally setting the threshold for binarization.

Further, false detection is suppressed as compared with the case of employing the difference value between two pixels due to the pattern matching according to two-dimensional luminance distribution, whereby the angle of the image having an oblique edge can be correctly detected.

When the reference patterns RA according to two-dimensional luminance distribution are employed, the detected angles are not restricted to those of straight lines connecting pixels located on point-symmetrical positions about the interpolated pixel but angles between these angles can also be detected. Therefore, the angles can be detected at smaller intervals with the line memory 31 having small capacity.

FIG. 10 is a block diagram showing another exemplary structure of the image angle detector outputting the angle signal AN.

The image angle detector shown in FIG. 10 includes a line memory 41, an upper line maximal/minimal detection part 42, a lower line maximal/minimal detection part 43, a pattern matching angle detection part 44 and a reference pattern generation part 45.

The video signal VD1 is input in the line memory 41 and the lower line maximal/minimal detection part 43. The line memory 41 delays the input video signal VD1 by one line (one scanning line) and outputs the video signal VD2. The video signal VD2 output from the line memory 41 is supplied to the upper line maximal/minimal detection part 42.

The upper line maximal/minimal detection part 42 detects the maximal and minimal points of horizontal luminance distribution in the video signal VD2 output from the line memory 41 and supplies a maximal/minimal pattern P1 indicating the positions of the maximal and minimal points to the pattern matching angle detection part 44. The lower line maximal/minimal detection part 43 detects the maximal and minimal points of horizontal luminance distribution in the input video signal VD1 and supplies a maximal/minimal pattern P2 indicating the positions of the maximal and minimal points to the pattern matching angle detection part 44. Each of the maximal/minimal patterns P1 and P2 has a size corresponding to one scanning line of a detection window.

The detection window is a rectangular area of 7 by 2 pixels including seven pixels of the video signal VD1 and seven pixels of the video signal VD2, a rectangular area of 15 by 2 pixels including 15 pixels of the video signal VD1 and 15 pixels of the video signal VD2 or the like, for example. In the following description, it is assumed that the size of the detection window is 7 by 2 pixels. In this case, the size of each of the maximal/minimal patterns P1 and P2 corresponds to seven pixels.

The reference pattern generation part 45 generates a plurality of reference patterns RB indicating positions of maximal and minimal points in the detection window, and supplies the same to the pattern matching angle detection part 44. Each of the reference patterns RB is equal in size to the detection window.

The pattern matching angle detection part 44 compares the maximal/minimal pattern P1 output from the upper line maximal/minimal detection part 42 and the maximal/minimal pattern P2 output from the lower maximal/minimal detection part 43 with each of the plurality of reference patterns RB supplied from the reference pattern generation part 45, and outputs the angle signal AN indicating the angle of the reference pattern RB matching with the maximal/minimal patterns P1 and P2.

The operation of comparing the maximal/minimal patterns P1 and P2 with each reference pattern RB is hereinafter referred to as pattern matching.

FIG. 11 is a model diagram showing exemplary maximal/minimal patterns P1 and P2 output from the upper line maximal/minimal detection part 42 and the lower line maximal/minimal detection part 43 shown in FIG. 10 respectively.

Referring to FIG. 11, symbol IN denotes an interpolated pixel, and symbol IL denotes an interpolated scanning line. Symbol AL denotes a scanning line located above the interpolated scanning line IL, and symbol BL denotes a scanning line located under the interpolated scanning line IL.

FIG. 11 shows positions of pixels having maximal and minimal points in horizontal luminance distribution as "large" and "small" respectively. In practice, the positions of the pixels having the maximal and minimal points are denoted by predetermined numerical values. In the maximal/minimal patterns P1 and P2, the angle of straight lines connecting the maximal points with each other and those connecting the minimal points with each other is 45° in the luminance distribution of the scanning lines AL and BL. It is assumed that the horizontal angle is zero and the oblique upper right angle is positive.

Figure 12:
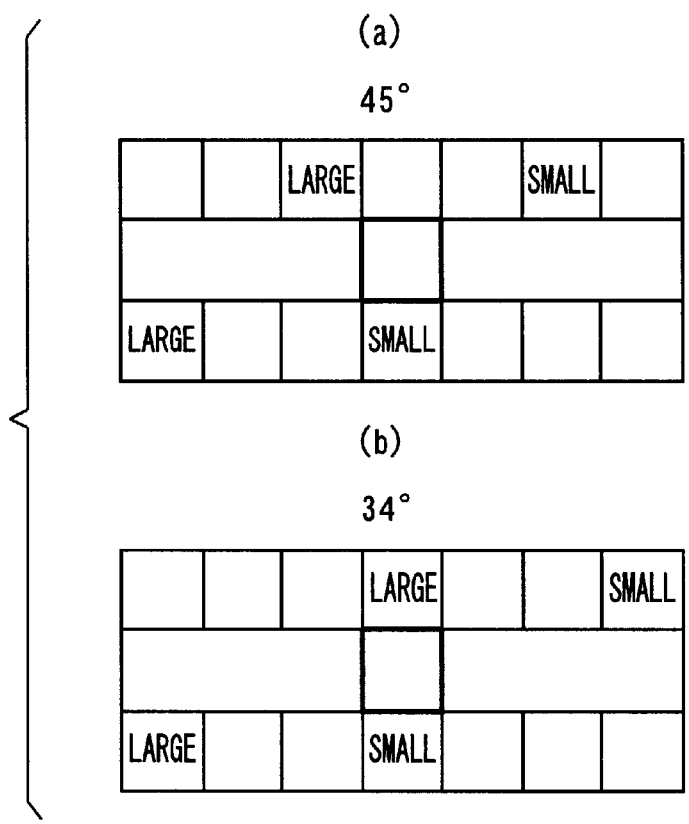
FIGS. 12(a) and 12(b) are model diagrams showing exemplary reference patterns generated by a reference pattern generation part shown in FIG. 11.
Figure 13:
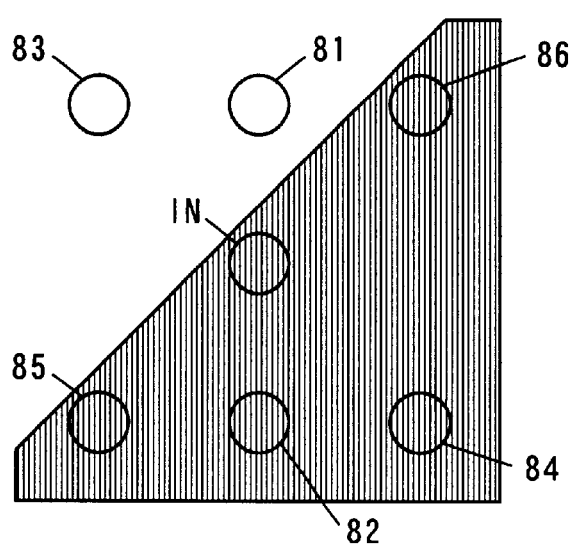
FIG. 13 is a model diagram for illustrating interpolation in a conventional scanning line interpolation equipment.

FIGS. 12(a) and 12(b) are model diagrams showing exemplary reference patterns generated by the reference pattern generation part 45 shown in FIG. 10.

FIGS. 12(a) and 12(b) show reference patterns of 45° and 34° respectively. These figures show positions of pixels having maximal and minimal points as "large" and "small" respectively. In practice, the positions of the pixels having the maximal and minimal points are indicated by predetermined numerical values.

As shown in FIGS. 12(a) and 12(b), angles of straight lines connecting maximal points and those connecting minimal points are set to 45° and 34° respectively in the luminance distribution of the two scanning lines with reference to pairs of maximal and minimal points.

For example, the maximal/minimal patterns P1 and P2 shown in FIG. 1 match with the reference pattern shown in FIG. 12(a). In this case, the pattern matching angle detection part 44 shown in FIG. 10 outputs an angle signal AN indicating 45°.

The image angle detector shown in FIG. 10 can detect the angle of the image with a small circuit scale by creating the maximal/minimal patterns P1 and P2 indicating the positions of the maximal and minimal points in the luminance distribution of the video signals VD1 and VD2 in the detection window and pattern-matching the maximal/minimal patterns P1 and P2 with the previously set plurality of reference patterns RB.

In this case, the angle of an image having thin oblique lines can be detected by detecting the maximal and minimal points as pairs.

Further, false detection is suppressed as compared with the case of employing the difference value between two pixels due to the pattern matching according to two-dimensional luminance distribution, whereby the angle of the image having small oblique lines can be correctly detected.

When the reference patterns RB according to two-dimensional luminance distribution are employed, the detected angles are not restricted to those of straight lines connecting pixels located on point-symmetrical positions about the interpolated pixel but angles between these angles can also be detected. Therefore, the angles can be detected at smaller intervals with the line memory 41 having small capacity.

When performing processing with the vertical upper and lower pixel value extraction part 13 and the intermediate vale determination part 20 shown in FIG. 5 and performing processing with the vertical upper and lower pixel difference absolute value operation part 15, it is preferable to employ the image angle detector shown in FIG. 7.

The structure of the image angle detector is not restricted to the above examples but a well-known correlation determination circuit disclosed in Japanese Patent Laid-Open No. 1-33167 (1989), for example, may alternatively be employed.

When the difference value between pixels obliquely located with respect to a pixel to be interpolated is between first and second values, the value of the pixel to be interpolated is calculated by an operation employing a first interpolated value calculated with vertical pixels and a second interpolated value calculated with the oblique pixels according to the present invention, whereby an image having an oblique edge can be smoothly interpolated.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A scanning line interpolation equipment interpolating a scanning line by calculating the value of a pixel to be interpolated on the basis of an input video signal, comprising:

first interpolation means calculating a first interpolated value by interpolation employing pixels of upper and lower scanning lines vertically located with respect to said pixel to be interpolated;

input means inputting a signal indicating the direction of an image with respect to said pixel to be interpolated;

difference calculation means calculating the difference value between the values of pixels of upper and lower scanning lines located in the direction indicated by said signal input by said input means with respect to said pixel to be interpolated;

second interpolation means calculating a second interpolated value by interpolation employing said pixels of said upper and lower scanning lines located in the direction indicated by said signal input by said input means with respect to said pixel to be interpolated; and interpolated value output means outputting said second interpolated value calculated by said second interpolation means as the value of said pixel to be interpolated when the difference value calculated by said difference calculation means is not more than a first value, outputting said first interpolated value calculated by said first interpolation means as the value of said pixel to be interpolated when the difference value calculated by said difference calculation means is not less than a second value greater than said first value, and calculating a third interpolated value by an operation employing said first interpolated value calculated by said first interpolation means and said second interpolated value calculated by said second interpolation means and outputting said third interpolated value as the value of said pixel to be interpolated when the difference value calculated by said difference calculation means is within the range between said first value and said second value.

2. The scanning line interpolation equipment according to claim 1, wherein said interpolated value output means adds said first interpolated value calculated by said first interpolation means and said second interpolated value calculated by said second interpolation means to each other in a ratio according to the difference value calculated by said difference calculation means when said difference value is within the range between said first value and said second value, and outputs the result of addition as the value of said pixel to be interpolated.

3. The scanning line interpolation equipment according to claim 2, wherein said interpolated value output means adds said first interpolated value and said second interpolated value to each other so that the ratio of said first interpolated value calculated by said first interpolation means is increased and the ratio of said second interpolated value calculated by said second interpolation means is reduced as the difference value calculated by said difference calculation means approaches said second value from said first value.

4. The scanning line interpolation equipment according to claim 1, wherein said difference calculation means calculates the difference values between the values of a plurality of pixels located in a plurality of directions about the direction indicated by said signal input by said input means with respect to said pixel to be interpolated respectively, and said second interpolation means calculates a plurality of second interpolated values by interpolation employing said plurality of pixels located in said plurality of directions about the direction indicated by said signal input by said input means with respect to said pixel to be interpolated respectively, said scanning line interpolation equipment further comprising:

minimum value determination means determining the minimum value among the plurality of difference values calculated by said difference calculation means, and selection means selecting a second interpolated value corresponding to the difference value determined as the minimum value by said minimum value determination means from said plurality of second interpolated values calculated by said second interpolation means and supplying the selected second interpolated value to said interpolated value output means.

5. The scanning line interpolation equipment according to claim 1, further comprising:

detection means detecting the values of pixels vertically located above and under said pixel to be interpolated respectively, and intermediate value determination means determining whether or not said second interpolated value calculated by said second interpolation means is between the values detected by said detection means, wherein said interpolated value output means outputs said first interpolated value calculated by said first interpolation means as the value of said pixel to be interpolated regardless of the difference value calculated by said difference calculation means when said intermediate value determination means determines that said second interpolated value is not between the values detected by said detection means.

6. The scanning line interpolation equipment according to claim 1, further comprising vertical difference operation means calculating the difference value between pixels vertically located above and under said pixel to be interpolated, wherein said interpolated value output means outputs said first interpolated value calculated by said first interpolation means regardless of the difference value calculated by said difference calculation means when the difference value calculated by said vertical difference operation means is less than a predetermined value.

7. The scanning line interpolation equipment according to claim 1, wherein said second interpolation means averages said pixels of said upper and lower scanning lines located in the direction indicated by said signal input by said input means with respect to said pixel to be interpolated as said second interpolated value.

8. The scanning line interpolation equipment according to claim 1, wherein said first value is zero, and said second value is a preset threshold.

9. The scanning line interpolation equipment according to claim 1, further comprising image angle detection means detecting an image angle related to said pixel to be interpolated on the basis of said input video signal and supplying said signal indicating the direction of said image to said input means, wherein said image angle detection means includes:

binarized pattern generation means binarizing said input video signal in a predetermined detection area including a plurality of scanning lines and said pixel to be interpolated and generating a binarized pattern, reference pattern generation means generating a binary image having a plurality of directions as a plurality of reference patterns, and comparison means comparing said binarized pattern generated by said binarized pattern generation means with each of said plurality of reference patterns generated by said reference pattern generation means and detecting said image angle related to said pixel to be interpolated on the basis of the result of comparison.

10. The scanning line interpolation equipment according to claim 1, further comprising image angle detection means detecting an image angle related to said pixel to be interpolated on the basis of said input video signal and supplying said signal indicating the direction of said image to said input means, wherein said image angle detection means includes:

maximal/minimal pattern generation means generating a maximal/minimal pattern indicating the position of the maximal point or the minimal point of horizontal luminance distribution every scanning line in a predetermined detection area including a plurality of scanning lines and said pixel to be interpolated in said input video signal, reference pattern generation means generating a plurality of reference patterns indicating the positions of the maximal points or the minimal points of horizontal luminance distribution every scanning line in said detection area, and comparison means comparing said maximal/minimal pattern generated by said maximal/minimal pattern generation means with each of said plurality of reference patterns generated by said reference pattern generation means and detecting said image angle related to said pixel to be interpolated on the basis of the result of comparison.

11. A scanning line interpolation equipment interpolating a scanning line by calculating the value of a pixel to be interpolated on the basis of an input video signal, comprising:

a first interpolation device that calculates a first interpolated value by interpolation employing pixels of upper and lower scanning lines vertically located with respect to said pixel to be interpolated;

an input terminal that receives a signal indicating the direction of an image with respect to said pixel to be interpolated;

a difference calculation device that calculates the difference value between the values of pixels of upper and lower scanning lines located in the direction indicated by said signal received in said input terminal with respect to said pixel to be interpolated;

a second interpolation device that calculates a second interpolated value by interpolation employing said pixels of said upper and lower scanning lines located in the direction indicated by said signal received in said input terminal with respect to said pixel to be interpolated; and an interpolated value output device that outputs said second interpolated value calculated by said second interpolation device as the value of said pixel to be interpolated when the difference value calculated by said difference calculation device is not more than a first value, outputs said first interpolated value calculated by said first interpolation device as the value of said pixel to be interpolated when the difference value calculated by said difference calculation device is not less than a second value greater than said first value, and calculates a third interpolated value by an operation employing said first interpolated value calculated by said first interpolation device and said second interpolated value calculated by said second interpolation device and outputs said third interpolated value as the value of said pixel to be interpolated when the difference value calculated value by said difference calculation device is within the range between said first value and said second value.

12. The scanning line interpolation equipment according to claim 11, wherein said interpolated value output device adds said first interpolated value calculated by said first interpolation device and said second interpolated value calculated by said second interpolation device to each other in a ratio according to the difference value calculated by said difference calculation device when said difference value is within the range between said first value and said second value, and outputs the result of addition as the value of said pixel to be interpolated.

13. The scanning line interpolation equipment according to claim 12, wherein said interpolated value output device adds said first interpolated value and said second interpolated value to each other so that the ratio of said first interpolated value calculated by said first interpolation device is increased and the ratio of said second interpolated value calculated by said second interpolation device is reduced as the difference value calculated by said difference value calculation device approaches said second value from said first value.

14. The scanning line interpolation equipment according to claim 11, wherein said difference calculation device calculates the difference values between the values of a plurality of pixels located in a plurality of directions about the direction indicated by said signal received in said input terminal with respect to said pixel to be interpolated respectively, and said second interpolation device calculates a plurality of second interpolated values by interpolation employing said plurality of pixels located in said plurality of directions about the direction indicated by said signal received in said input terminal with respect to said pixel to be interpolated respectively, said scanning line interpolation equipment further comprising:
  a minimum value determination device that determines the minimum value among the plurality of difference values calculated by said difference calculation device, and
  a selection device that selects a second interpolated value corresponding to the difference value determined as the minimum value by said minimum value determination device from said plurality of second interpolated values calculated by said second interpolation device and supplies the selected second interpolated value to said interpolated value output device.

15. The scanning line interpolation equipment according to claim 11, further comprising:
  a detection device that detects the values of pixels vertically located above and under said pixel to be interpolated respectively, and
  an intermediate value determination device that determines whether or not said second interpolated value calculated by said second interpolation device is between the values detected by said detection device, wherein
    said interpolated value output device outputs said first interpolated value calculated by said first interpolation device as the value of said pixel to be interpolated regardless of the difference value calculated by said difference calculation device when said intermediate value determination device determines that said second interpolated value is not between the values detected by said detection device.

16. The scanning line interpolation equipment according to claim 11, further comprising a vertical difference operation device that calculates the difference value between pixels vertically located above and under said pixel to be interpolated, wherein
  said interpolated value output device outputs said first interpolated value calculated by said first interpolation device regardless of the difference value calculated by said difference calculation device when the difference value calculated by said vertical difference operation device is less than a predetermined value.

17. The scanning line interpolation equipment according to claim 11, wherein said second interpolation device averages said pixels of said upper and lower scanning lines located in the direction indicated by said signal received in said input terminal with respect to said pixel to be interpolated as said second interpolated value.

18. The scanning line interpolation equipment according to claim 11, wherein said first value is zero, and said second value is a preset threshold.

19. The scanning line interpolation equipment according to claim 11, further comprising an image angle detection device that detects an image angle related to said pixel to be interpolated on the basis of said input video signal and supplies said signal indicating the direction of said image to said input terminal, wherein
  said image angle detection device includes:
    a binarized pattern generation device that binarizes said input video signal in a predetermined detection area including a plurality of scanning lines and said pixel to be interpolates and generates a binarized pattern,
    a reference pattern generation device that generates a binary image having a plurality of directions as a plurality of reference patterns, and
    a comparison device that compares said binarized pattern generated by said binarized pattern generation device with each of said plurality of reference patterns generated by said reference pattern generation device and detects said image angle related to said pixel to be interpolated on the basis of the result of comparison.

20. The scanning line interpolation equipment according to claim 11, further comprising an image angle detection device that detects an image angle related to said pixel to be interpolated on the basis of said input video signal and supplies said signal indicating the direction of said image to said input terminal, wherein said image angle detection device includes:

a maximal/minimal pattern generation device that generates a maximal/minimal pattern indicating the position of the maximal point or the minimal point of horizontal luminance distribution every scanning line in a predetermined detection area including a plurality of scanning lines and said pixel to be interpolated in said input video signal, a reference pattern generation device that generates a plurality of reference patterns indicating the positions of the maximal points or the minimal points of horizontal luminance distribution every scanning line in said detection area, and a comparison device that compares said maximal/minimal pattern generated by said maximal/minimal pattern generation device with each of said plurality of reference patterns generated by said reference pattern generation device and detects said image angle related to said pixel to be interpolated on the basis of the result of comparison.

* * * * *